(No Model.) 4 Sheets—Sheet 1.

G. W. QUINN.
CORN HARVESTER.

No. 471,139. Patented Mar. 22, 1892.

Witnesses:
Louis M. F. Whitehead
Sidney N. Brainard

Inventor:
George W. Quinn.
by Dayton, Poole & Brown
his Attorneys (No Model.) 4 Sheets—Sheet 2.

G. W. QUINN.
CORN HARVESTER.

No. 471,139. Patented Mar. 22, 1892.

Witnesses:
Louis M. T. Whitehead.
Sidney W. Brainard

Inventor:
George W. Quinn
by
Daylin Poole & Brown
his Attorneys

United States Patent Office.

GEORGE W. QUINN, OF BLOOMINGTON, ILLINOIS.

CORN-HARVESTER.

SPECIFICATION forming part of Letters Patent No. 471,139, dated March 22, 1892.

Application filed November 10, 1891. Serial No. 411,514. (No model.)

*To all whom it may concern:*

Be it known that I, GEORGE W. QUINN, of the town of Bloomington, in the county of McLean and State of Illinois, have invented certain new and useful Improvements in Corn-Harvesters; and I do hereby declare that the following is a full, clear, and exact description thereof, reference being had to the accompanying drawings, and to the letters of reference marked thereon, which form a part of this specification.

This invention relates to corn-harvesters of that class in which the stalks, which are cut near the ground by a cutting apparatus carried by the machine in the advance of the latter, are collected upon the machine in a standing or upright position and in the form of a shock and deposited upon the ground while still upright and in the form of a shock.

The object of the invention is to improve the construction of a machine of the character above referred to in several particulars, as will hereinafter appear; and it consists in the matters hereinafter described, and pointed out in the appended claims.

The machine herein shown as embodying my invention is adapted to cut two rows of corn at once, and to this end the frame of the machine is made of a width somewhat greater than that occupied by the two rows of corn, and is supported by wheels located at the sides of the frame and running in the spaces between the two rows which are to be cut by the machine and the adjacent rows outside of them. The draft connections are shown as arranged for a horse or horses traveling between the two rows which are operated upon by the machine, it being of course understood that when two or more horses are used they are arranged one before the other, or "tandem."

The operative parts of the machine embrace as their main features cutters located at the advance or front end of the machine, a horizontally-arranged traveling platform or apron located at the rear of the cutters and having during the cutting operation a slow rearward movement, but capable of a rapid rearward movement, when desired, for discharging the shock from the machine, a yoke or support for the upper parts of the stalks, arranged at a considerable distance above the traveling platform, rearwardly and laterally movable arms or fingers located at the forward end of the machine for moving or carrying the butt-ends of the stalks rearwardly and laterally upon the platform for the purpose of distributing the said butt-ends of the stalks properly thereon, and a rearwardly-moving carrier provided with prongs or rake-teeth, located at the forward end of the machine at a point considerably above the cutters for carrying the upper parts of the stalks rearwardly toward the said yoke or support, together with suitable actuating devices for moving or driving the said traveling platform and the said fingers or arms and rake-teeth. Said platform when driven at its usual or slow speed moves to the rear sufficiently fast to provide for the separation of the butts of the stalks as the latter are deposited thereon, so as to spread the lower ends of the stalks standing on the platform from front to rear, while the upper parts of the stalks are held centrally over the platform by the yoke or support above referred to, thereby giving the necessary pyramidal or conical form to the bundle or shock formed by the accumulated stalks. In the forward movement of the machine, therefore, the stalks cut by the knives are carried rearward by the rearwardly-moving arms or fingers and the rake-teeth above referred to, both at their upper and lower ends, until their lower ends or butts rest upon the forward end of the traveling platform and their upper ends rest in the centrally-arranged elevated yoke or support, so that when first deposited on the machine the stalks rest in a rearwardly and upwardly inclined position. The slow rearward movement of the platform, however, gradually carries the butt-ends of the stalks to the rear, while their upper ends are sustained in the elevated yoke or support, and as new stalks are constantly added at the forward end of the rearwardly-traveling platform the butt-ends of the stalks are separated or spread apart, while their upper ends rest in contact with each other within the elevated support or yoke. Said elevated support or yoke being arranged centrally over the traveling platform and the latter carrying the butts of the stalks rearwardly in the manner described, it is obvious that the butts of those stalks which are first deposited on the platform will soon reach the middle of the platform at a point beneath the elevated support or yoke, at which time the stalks will stand vertically and will finally be carried to the rear of the elevated support or yoke, when they will rest in an inclined position, with their upper ends inclining forwardly or toward the front of the machine. The elevated yoke or support referred to being open at its front end to receive the stalks and being adapted to support the rear and sides of the bundle or shock only, it is obvious that the stalks first deposited (the butts of which are carried to the rear of the elevated support or yoke by the movement of the platform in the manner described) would when inclined obliquely forward, as above described, fall forward by gravity were it not for other stalks which are being continually deposited on the platform so as to rest in a rearwardly-inclined position in the yoke or elevated support, and which thereby operate to hold the forwardly-inclined stalks first deposited from falling forward or becoming displaced, it being obvious that the stalks thus deposited or accumulated on the moving platform and supported at their upper ends in the manner described tend to sustain each other by reason of the spreading apart of their lower ends in the same manner as is done with the stalks of a shock as ordinarily made by hand in the field.

In the above description of the operation of the traveling platform and elevated yoke or support in forming or building a shock with a spreading base reference has only been made to the distribution or spreading apart from front to rear of the butts or lower ends of the stalks. It is of course, however, necessary to also spread the butts of the stalks laterally in order to incline the tops of the stalks inwardly from both sides of the machine toward the central part thereof, and thereby make the shock of concentric form. The elevated yoke or support, which engages the tops of the corn, is constructed to confine the tops of the corn laterally within a relatively-narrow space over the center of the platform, and to secure the spreading or distribution of the butts outwardly beyond the sides of the yokes or toward the side edges of the platform the traveling arms or fingers which carry the butts of the stalks rearwardly from the knives to the front edge of the platform are arranged to also travel laterally outward over the front part of the platform, so as to shift or move the ends laterally upon the platform and in a direction toward the outer side edges of the same, so that when the outermost stalks leave the said fingers as the stalks are carried rearwardly in the slow rearward movement of the platform they will have reached a position near the outer edges of said platform. The said rearwardly and outwardly moving arms therefore are acting to constantly distribute the butts of the stalks laterally toward the outer edges of the platform, while the slow rearward movement of the platform tends to separate or distribute all of the stalks in a direction from front to rear of the machine, so that the butts of the stalks of the entire mass or bundle accumulated are distributed throughout the entire area of the platform at their lower ends, while their upper ends are confined centrally over the platform, thus giving the desired pyramidal or conical form to the shock.

After a sufficient number of stalks have been accumulated upon the platform to practically fill the same and form a complete shock the upper ends of the stalks are confined by means of a band placed around the same at or near the point where they are confined by the elevated support or yoke, and the shock is then discharged from the machine and deposited upon the ground by first lifting the yoke to free it from the upper part of the shock and then giving a rapid rearward movement to the traveling platform, so as to carry the shock quickly toward the rear and deposit it upon the ground, the speed of the traveling platform in such rearward movement being made equal to or approximately equal to the rate of the forward movement of the machine, so that as the butts of the stalks drop from the platform to the ground they will remain at the same distance apart and the conical form of the shock will thereby be preserved.

It is obviously desirable that the platform should be as close to the ground as possible when the shock is discharged therefrom, in order to prevent the same from being overthrown at such time, and for this purpose the platform is made vertically movable and adapted to be dropped from its ordinary working position to a point near the ground at the time of the discharge of the stalks and to be again elevated into its working position before beginning the accumulation of a new shock.

The invention will be more fully understood by reference to the accompanying drawings, in which—

Fig. 17 is a detail section through the pivotal connection between one of the rearwardly-moving arms and its actuating-arm, taken on line 17 17 of Fig. 5.

The main frame of the machine shown in the drawings consists of a transverse horizontal frame-piece A, located at the front of the machine, and two parallel side pieces A' A', attached at their front ends to the frame-piece A and extending rearwardly therefrom, said frame-piece A being shown as made of wood and the side pieces A' A' of metal. Mounted upon the side frame-pieces A' A' are supporting-wheels B B, and at the rear ends of said frame-pieces are caster or trailing wheels B' B'. The wheels B B are arranged to sustain the greater part of the weight of the machine and serve as driving-wheels for actuating the working parts thereof, said wheels for this purpose being provided with gear-wheels $B^2 B^2$, attached rigidly to the inner sides of the spokes of said wheels. To allow of vertical bodily adjustment of the machine-frame relatively to the ground, said wheels B B are mounted on short or stub axles $B^3 B^3$, which are secured in plates $B^4 B^4$, arranged to slide in suitable guideways or slots $b$, formed in brackets $B^5 B^5$, attached to the side pieces A' A', said plates being held or clamped in said guideways $b\ b$ by means of set-screws $b'\ b'$.

At the center of the frame-piece A, extending forwardly therefrom, is a platform $A^2$ for the driver, and forward of the said frame-piece at either side of the platform are located knives or cutters C C, by which the stalks are severed. The space between the parallel side pieces A' A' and at the rear of the frame-piece A is occupied by the traveling platform or apron D, which latter is movable vertically with relation to the said frame-pieces A' A' within the space afforded by the said frame-pieces, which latter are connected with each other by means of the said cross-piece A only, so that there are no transverse frame-pieces at the rear of the machine to interfere with the rearward movement of the stalks resting on the platform past or over the rear edges of the platform when the same are delivered from the latter to the ground.

Supported from the side pieces A' A', at a point considerably above the platform D, is an elevated grain support or yoke E, the same being provided with a central U-shaped part $e$, arranged with its open end forward and with lateral parts or arms $e'\ e'$, by which the central part of the yoke is sustained in position, and which are pivotally connected at their outer ends with supporting-standards E' E', attached to the said frame-pieces A' A'.

F F F are a series of rearwardly and outwardly movable arms or fingers mounted upon a revolving wheel or support F' over the main frame-piece A and arranged to sweep past or over the knives C C and the forward part of the apron D, so as to carry the butts of the stalks as they are cut by the knives rearwardly over the said frame-piece A and deposit them upon the forward end of the said apron, while at the same time shifting or carrying the same laterally outward upon the apron as said butts are carried rearwardly upon the same. In order to facilitate the withdrawal or release of the said fingers F from engagement with the stalks, they are pivotally connected with the wheel F' and are actuated by devices arranged to turn them on their pivots, and thereby bring them into a position best calculated to effect their release from the stalks without disturbing the position of the latter after they have been properly delivered to the apron. The devices employed for giving such movement to said fingers will be hereinafter described.

G G indicate as a whole traveling carrier-belts or rakes having rake-teeth for engaging and carrying rearward toward the yoke E the upper parts of the standing stalks. Each of said carrier-belts consists, as herein shown, of two chain belts $G'\ G^2$, one located above the other at a considerable distance apart and having attached to them vertically-arranged finger bars or rakes $G^3$, provided with projecting fingers or teeth $g\ g$ to engage the stalks. The said carrier G is located over or above the wheels F' F' and extend from points considerably forward of the cutting-knives and outside of the rows of corn to be cut rearwardly and inwardly to points adjacent to the forward ends of the central part $e$ of the yoke E, and the said belts are driven at a speed faster than that of the fingers F F, so that the said rakes will engage the upper parts of the stalks and carry them rearward toward the yoke, thereby tending to bring the stalks into a rearwardly-inclined position. The carriers thus arranged act upon the stalks before they are cut, so as to carry them rearwardly to and over the knives, and while the fingers F F are moving the butts of the stalks rearwardly toward and delivering them upon the forward end of the apron said carriers act to carry the upper parts of the stalks more rapidly toward the yoke E, and thereby insure the upper ends of the stalks being delivered in a rearwardly-inclined position against or within the yoke, notwithstanding the action of the wind, which might otherwise prevent the proper placing of the stalks upon the machine.

In the operation of the main parts of the machine above described the standing stalks which are severed by the knives C C in the advance of the machine are carried rearward over the frame-piece A at their lower ends by the fingers F F and at their upper parts by the carriers G G until the lower ends rest upon the forward part of the apron D and their upper ends rest within the central part e of the yoke E. The lower ends or butts will be distributed laterally over or across the apron from the fact that the butts of the outermost stalks of the rows will be carried by said fingers F F laterally outward and will be left near the outer margins of the apron by the withdrawal of said fingers from engagement therewith, while the stalks which are nearest the center of the machine will pass from engagement with the fingers as soon as they reach the platform and in some instances will be shifted laterally by said fingers to a very slight extent or not at all. There will of course be a space at the center of the apron at the rear or in the path of the driver's platform $A^2$, at which there will be few or no butts deposited; but this is an advantage, inasmuch as it is desirable to spread the butts as much as possible in order to give stability to the shock, and the fact that there are few or no stalks standing upright at the center of the shock will tend to increase the stability of the same and lessen the liability of its being overthrown. As the butts of the stalks are distributed upon the outer parts of the apron by the rearward and outward movement of the fingers F F, the rearward movement of the apron will effect the distribution of the butts from front to rear of the machine; or, in other words, the butts of the stalks will be deposited upon the apron with intervals between them from front to rear as well as laterally, so that when the part of the apron on which the butts of the first stalks are delivered reaches the rear part of the machine the apron will be covered from end to end by the butts resting at practically equal intervals thereon. The speed of the apron is of course relatively slow and such that in corn of ordinary growth a sufficient quantity to form a shock of the desired size will be gathered or cut during the time that any one point or part of the apron is traveling from the front to the rear of the machine. By reason of this rearward movement of the apron the stalks which are first deposited on the forward part thereof and which by resting at their upper ends against or within the yoke E have assumed a rearwardly-inclined position are obviously first brought into a position more nearly vertical when they reach the central part of the apron and are then brought into a forwardly-inclined position when their lower ends reach the rear part of the apron. Inasmuch as their butts rest upon the side portions of the apron, the greater part, if not all, of the stalks are at all times inclined inwardly toward the central line of said apron as well as toward the front or rear. It is of course obvious that in case a few stalks only were deposited on the forward end of the apron and no others were added when the butts of those stalks had been carried to the rear of the yoke E the tops of the same would then be liable to fall forwardly out of the yoke by reason of the open front end of the latter. This will not occur, however, when stalks are continually added or deposited on the apron, because those coming upon the front part of the apron will lean or incline toward the rear, while those previously deposited and which are then at the rear part of the apron will be inclined forward, so that the rearwardly and forwardly inclined stalks will brace or support each other, and thus form a perfect shock. In practice, however, there will be little possibility of any of the stalks actually falling forward out of place when their butts are carried to the rear of the yoke, for the reason that the butts of the stalks being located mainly at the sides of the apron their upper ends will tend to fall or rest against the opposite side of the yoke and will be unable to escape from the front end of the latter by reason of the presence of the carriers G G, which terminate at either side of the open end of the yoke and would engage and carry inwardly any stalks which might by accident fall toward such open end of the yoke.

After a shock has been formed the tops of the stalks are bound together by placing a band around the same by hand, the yoke E is disengaged from the shock by swinging its rear end upwardly, the yoke at such time turning on the pivotal connection between its arms $e\ e$ and the standards $E'\ E'$, and by then dropping the platform until it is near the ground and giving it a rapid rearward motion to carry the shock therefrom, and thereby effect its discharge while still in an upright position.

Having described generally the main features of the machine and indicated their manner of operation, the details of construction in such features herein illustrated, together with the means for actuating the several moving parts, will now be set forth in detail.

Figures 3, 16:
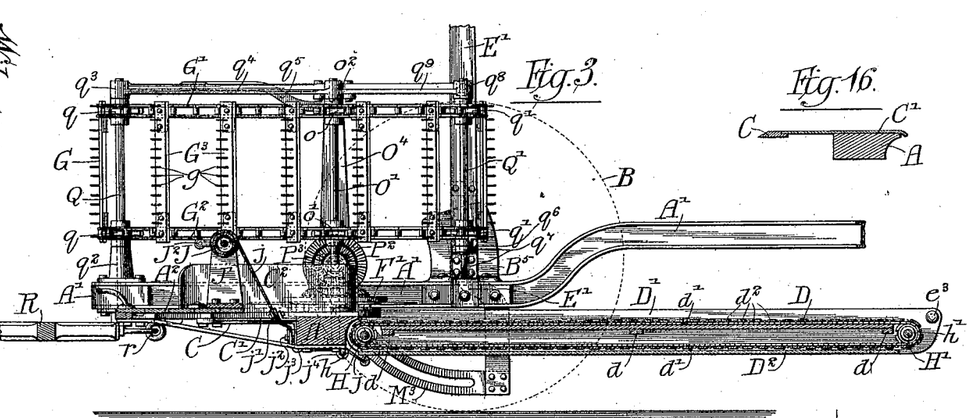
Fig. 3 is a central vertical section of the machine, taken upon line 3 3 of Fig. 1.
Fig. 16 is a detail section of the cutting-knives, taken on line 16 16 of Fig. 1.

To first describe the construction and location of the knives or cutters and parts adjacent thereto, the same are made as follows: Said knives or cutters C C are of that class which are attached to the machine-frame and act by being drawn or carried toward the standing stalks in the forward movement of the machine. Said cutters C C consist of obliquely-arranged bars attached at their rear ends to the frame-piece A and at their forward ends to the sides of the driver's platform $A^2$, and are inclined forwardly and inwardly, so as to present a cutting-edge to the corn, which is oblique with reference to the path of the machine, and which therefore acts with a gradual or draw cut. The upper surfaces of the knives C C are arranged in substantially the same plane with the top of the frame-piece A and the triangular space between the rear edges of the bars, constituting the knives proper, and the front edge of the said frame-piece is filled by a horizontal plate C′, which serves to support the cut stalks as the same are moved rearwardly from the knives to the apron by the action of the fingers F F. As a simple and convenient construction in the parts, the said plate C′ is extended over the frame-piece A to or slightly past the rear edge thereof, so as to afford a smooth and continuous surface on which the lower ends of the stalks rest while being carried rearward by said fingers. These parts are more clearly shown in the detail section, Fig. 16. At the sides of the said platform $A^2$, adjacent to the knives, are located vertical guide-plates $C^2 C^2$, which serve to confine the ends of the stalks upon the plates C′ C′ and to hold them within the range of the fingers F F while passing rearward over said plates. In order to facilitate the inward movement and proper distribution of the butts of the stalks, the said guide-plates $C^2 C^2$ are arranged obliquely with their inner ends inclined toward the center of the machine, as clearly shown in the drawings, Fig. 1. Said guide-plates are shown as extending inwardly past or over the frame-piece A and as terminating at the rear edge of said frame-piece. By reason of the oblique position of said guide-plates the sides of the platform $A^2$ are not parallel, but terminate in line with the guide-plates, or, in other words, are inclined to correspond with the same, while the inner margins of the horizontal supporting-plates C′ C′ are extended to or inclined at an angle corresponding with the said guide-plates, as clearly shown in the drawings, Fig. 1.

I next refer to the construction of the traveling platform or apron D and means for driving or actuating the same. Said parts are made as follows: The movable frame on which said apron is supported consists of two side pieces D′ D′, connected by cross-pieces $d\,d$, Fig. 3. At the front and rear ends thereof are mounted transverse shafts H H′, provided with sprocket-wheels $h\,h'$, over which are trained chain belts $d'\,d'$, carrying cross-slats $d^2\,d^2$, constituting the apron proper. The frame, consisting of the side pieces D′ D′ and cross-pieces $d$, is connected with the main frame of the machine by means of pivoted bars or links I I′, of which the forward links I I are pivoted to the side bars D′ D′ concentrically with the forward shaft H and to the main frame concentrically with the wheels B B, and the rear links I′ I′ are pivoted to the rear ends of the said side bars concentric with the rear shaft H′ thereof and to the rear ends of the frame pieces A′ at points at the rear of the rear edge of said apron. The axles of the wheels B B being adjustably secured to the frames in the manner described, the forward links I I are pivoted upon the axle of said wheels, so that they are moved with the axles when the latter are adjusted. The rearward links I′ L′ are preferably made somewhat shorter than the forward links and pivoted to the main frame at points somewhat lower than those at which the forward links are pivoted thereto, so that when the apron is bodily raised and lowered by the swinging of said links I I′ about their points of attachment to the frame the rear end of the apron, will be thrown nearer the ground than the front end. This construction obviously facilitates the discharge of the shock from the apron, while lessening the liability of the front end of the same being damaged by contact with stones or other obstructions in the forward movement of the machine. To protect the lower part of the apron, a continuous horizontal bottom $D^2$ is secured to the side pieces D′ D′ beneath said apron. The apron-frame is allowed to fall by gravity to its lowermost position, and is lifted by being drawn upwardly and forwardly until its front end is adjacent to the frame-piece A, the links I I′ being approximately vertical when the apron is in its lowermost position and inclined downwardly and forwardly when the said apron is lifted.

To accomplish the lifting of the apron in the manner described, I have provided devices as follows:

J, Figs. 1, 2, 14, and 15, is a windlass-barrel mounted in standards J′, attached to the driver's platform $A^2$, beneath and adjacent to the driver's seat $A^3$, which is mounted on said platform. Said windlass-barrel is provided with a hand-crank $J^2$, by which it may be rotated by the driver.

$j\,j$ are lifting-ropes adapted to wind around the barrel J of the windlass and extending from the same over suitable guide-pulleys on the machine-frame to the forward ends of the frame-pieces D′ D′ of the apron. In the particular construction shown the said lifting-ropes pass over pulleys $j'\,j'$ at the central part of the frame-piece A and outwardly along the front edge of said frame-piece beneath the knives C C to the pulleys $j^2\,j^2$ at the outer ends of said frame-piece and thence beneath other pulleys $j^3\,j^3$ and over pulleys $j^4\,j^4$, located at the lower part of the outer end of the said frame-piece A, downwardly and rearwardly to the front end of the said side pieces D′ D′ of the apron-frame. A pawl $j^5$, acting on a ratchet-wheel $j^6$ upon the windlass-barrel J, serves to prevent the backward movement of the windlass-barrel and holds the apron-frame in its elevated position as soon as it reaches that position, when lifted by the turning of the windlass-barrel. The apron may be quickly and easily lowered by disengaging the pawl and allowing the lifting-ropes to unwind from the windlass-barrel.

Two sets of driving devices are provided for actuating the apron D, one arranged to drive the same at a slow speed in gathering the stalks and the other at a high speed for discharging the shock, and in order to facilitate the operation of the machine devices are provided by which the two sets of driving mechanisms are automatically thrown into and out of operation when the apron is bodily elevated or depressed, it being obvious that the apron need be driven at a low speed only when elevated and at a high speed only when lowered for the discharge of the shock.

The driving mechanisms, arranged for operation in the manner described, as herein shown, are constructed as follows:

To first describe the driving mechanism for giving slow movement to the apron when the latter is elevated, K indicates a short shaft arranged in alignment with the front shaft H of the apron and mounted in a bearing $k$, which is secured to the outer face of the frame-piece D′, said shaft being held in engagement with the bearing by means of a collar $k'$, secured to the inner end of the shaft and resting within a recess in the inner face of said bearing. Said shaft K extends outwardly to a point opposite the gear-wheel B² on one of the wheels B and is provided with a pinion K′ intermeshing with said gear-wheel. Attached to the said shaft K adjacent to the bearing $k$ is a bevel gear-wheel K², and upon said bearing, between said frame-piece D′ and the gear-wheel K is mounted the end of one of the supporting-links I of the apron-frame. The gear-wheel K² intermeshes with a bevel-gear K³, which is secured upon the end of a shaft K⁴, which extends lengthwise of the side pieces D′ to a point near the rear ends of the same, having bearings $k^3$ $k^3$ attached to the said side pieces D′. The link I is bent at right angles near its end in the manner shown to engage the bearing $k$ without interfering with the bevel-gear K³. At the rear end of said shaft K⁴, Figs. 1, 2, 12, and 13, is mounted a worm K⁵, adapted to engage a worm-wheel L, which is mounted upon a stud $l$, secured to the said side piece D′. Attached to the worm-wheel L is a gear-pinion L′, which intermeshes with a gear-wheel L², which is mounted upon a stud $l'$, also attached to the side piece D′. Attached to the gear-wheel L² is a pinion L³, which intermeshes with a gear-wheel L⁴, mounted loosely on the end of the shaft H′, which extends outwardly beyond the said side piece. Secured to the said shaft adjacent to the gear-wheel L⁴ is a ratchet-wheel L⁵, Fig. 13, with which is engaged a spring-pawl $l^2$, pivoted upon the said gear-wheel L⁴. Said pawl and ratchet-wheel are so arranged that the shaft H′ may be turned forward independently of the gearing described when the apron is driven rapidly by the separate actuating mechanism hereinbefore referred to, while at the same time it properly transmits the shaft motion in the same direction when the gear-wheel L⁴ is rotated through the medium of the shaft K⁴ and gearing, hereinbefore described. The several gears L′, L², L³, and L⁴ are employed merely for the purpose of giving the desired slow speed to the apron, and it is obviously possible to produce the same result by a different arrangement of gears, or to employ other speed-reducing mechanisms to attain the same end. Pivotal connection between the rear supporting-link I′ and the frame-piece D′ is herein shown as formed by means of a hub $l^3$, which extends outwardly from a plate $l^4$, attached to the outer face of the side piece D′ and which forms a bearing for the shaft H′, while its outer cylindric surface is engaged with a bearing-aperture in the end of the link I′, and thereby pivotally supports the link concentrically with the shaft H′.

Figures 4, 5, 11:
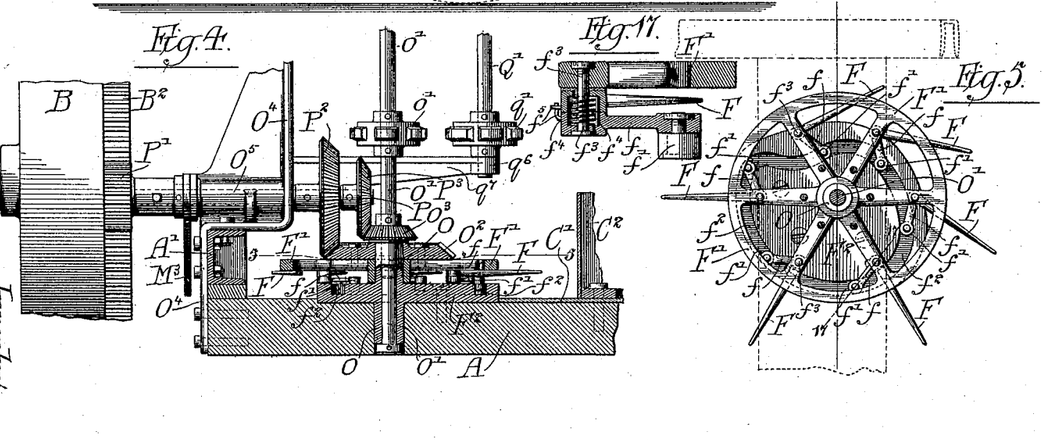
Fig. 4 is a detail vertical section taken upon line 4 4 of Fig. 1.
Fig. 5 is a detail plan section taken on line 5 5 of Fig. 4.
Fig. 11 is a plan view of a modification shown in Fig. 10.
Figure 6:
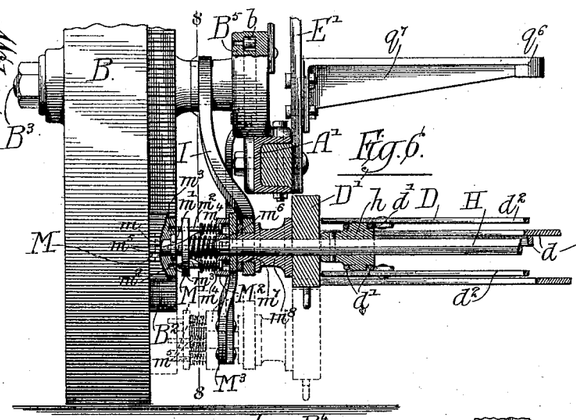
Fig. 6 is a detail vertical section taken on line 6 6 of Fig. 1.
Figures 7, 9:
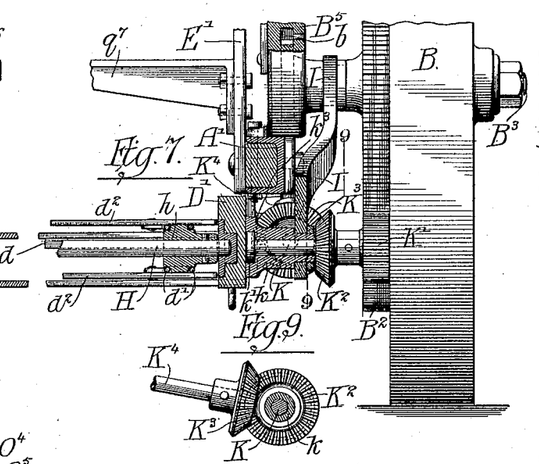
Fig. 7 is a similar section taken on line 7 7 of Fig. 1.
Fig. 9 is a detail section taken upon line 9 9 of Fig. 7.
Figure 8:
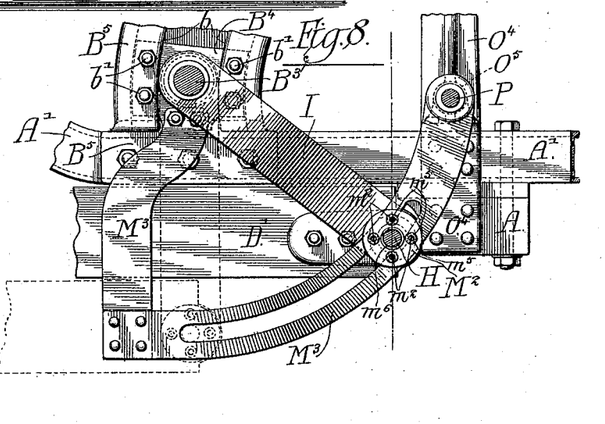
Fig. 8 is a sectional elevation taken upon line 8 8 of Figs. 1 and 6.
Figure 10:
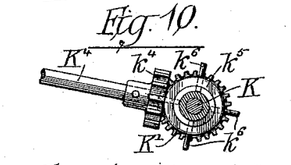
Fig. 10 illustrates a modification of the features shown in Fig. 9.
Figure 11:
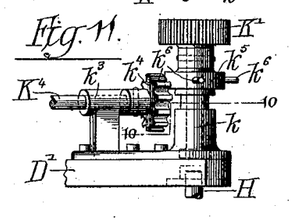

The construction described in the driving mechanism for giving slow movement to the apron D is obviously one incapable of affording a change of speed in the apron except by changing the gears above referred to. It is often desirable, however, to provide for a variation in the speed of the apron, inasmuch as the latter should move more slowly in thin or sparse corn than where the corn is thick or heavy in order to make the shocks of approximately the same size, and while any form of change-speed mechanism will accomplish this result I have shown in the drawings, Figs. 10 and 11, one simple form of device for this purpose. In this construction the gear connecting the transverse shafts K with the longitudinal shaft K⁴ consists of a spur-wheel $k^4$ on the shaft K⁴ and a disk $k^5$, secured to the shaft K and provided with a series of radially-arranged pins $k^6$ $k^6$, adapted to engage the teeth of the spur-wheel $k^4$ for turning said wheel. The pins $k^6$ $k^6$ are placed in the disk $k^5$ at a distance apart greater than the distance between the teeth of the spur-wheel, so that the said pins as they encounter the spur-wheel turn the same by step-by-step movement instead of continuously. Said pins $k^6$ $k^6$ are removably secured in the disk, so that one, two, or more of them may be removed with the result of moving the spur-wheel more or less frequently, according to the number of pins remaining in the disk. This construction will obviously produce an intermittent movement of the spur-wheel at irregular intervals; but this is no disadvantage, inasmuch as the apron moves very slowly and the slight irregularity thus caused in its movement would have no appreciable effect in the distribution of the butts of the stalks upon the surface of the same. The device shown in Figs. 10 and 11 is merely for the purpose of illustration, and any other change-speed device may be employed, as found convenient or desirable, in cases where the variations in the thickness of the corn make the use of such change-speed device desirable or necessary.

Figures 1, 18, 19:
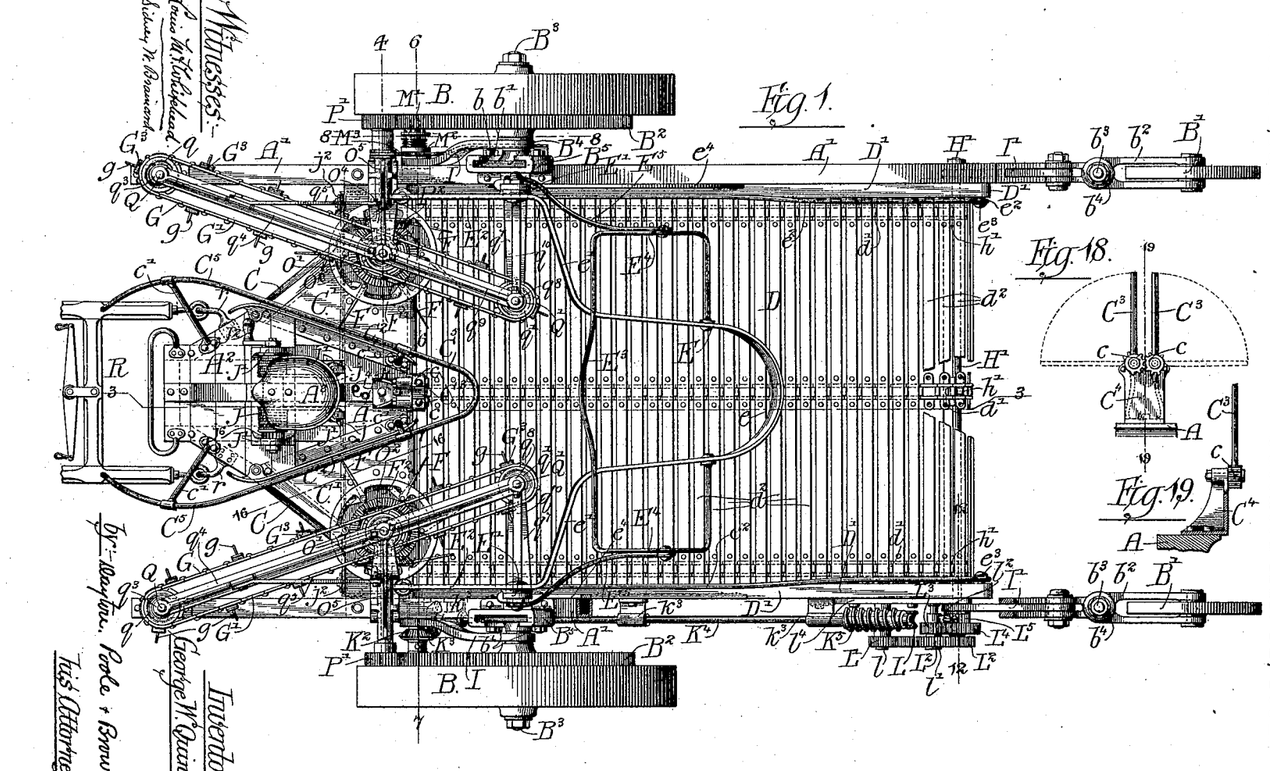
Figure 1 is a plan view of a machine embodying my invention.
Fig. 18 is a detail side view of the swinging arms which serve to interrupt the backward movement of the stalks when the apron is depressed.
Fig. 19 is a sectional view on line 19 19 of Fig. 18.

The mechanism for giving rapid motion to the apron at the time of the discharge of the shock is shown in Figs. 1, 6, 8, and 17. The end of the forward apron-shaft H opposite to that at which the gearing above described is located is extended past the side pieces D′ to a point opposite the gear-wheel B² and is there provided with a gear-pinion M, intermeshing with said gear B², but loosely mounted on the shaft between two collars $m$ $m'$ thereon. M' is a disk fixed upon and turning with the shaft H. A similar disk $M^2$ is located inside of the disk M' and mounted to slide endwise, but not to rotate on siad shaft H. A plurality of sliding pins $m^2 m^2$, Fig. 1, are arranged parallel with the shaft around the same, said pins being supported in bearing-apertures in both disks and having at their inner ends heads arranged to slide in enlarged parts of the bearing-apertures of the inner disk $M^2$. Said pins are adapted to slide freely through both of the disks M' and $M^2$ and to engage at their outer ends with holes $m^3 m^3$ in the gear-pinion M. Springs $m^4 m^4$, surrounding the pins referred to between the disk and collars $m^5 m^5$ on the pins between said disks, serve to normally hold said pins at the forward limit of their movement relatively to the disk $M^2$, and a spring $m^6$ between said disks operates to hold the disk $M^2$ at the inward limit of its movement on the shaft. By forcing said disk $M^2$ outwardly against the action of the said spring $m^6$, however, said pins will be thrust forward through the disk M' and will become engaged with the holes in the pinion and the latter will be held from turning upon the shaft. If, however, the said holes are not in position to engage the pins when the disk $M^2$ is advanced, said pins will yield backwardly in said disk by the compression of the springs $m^4 m^4$ and will be held against the pinion by said springs until by the turning of said pinion the holes in the same are brought opposite the pins, when the latter will be thrown forward by the springs into engagement with the pinion. The sliding disk and pins, arranged and operating in the manner described, therefore constitute a clutch device by which the pinion M may be made to turn with or freed from the shaft H at will.

$M^3$ is a cam strip or guide secured to the frame of the machine adjacent to the path of the disk $M^2$ and arranged on a circle or curve concentric with the wheel-axle $b$, on which said link I turns. Said cam-strip $M^3$ is adapted for engagement with the disk $M^2$ in such manner as to move the disk endwise on the shaft H against the action of the spring $m^6$ when the apron is raised or lowered, and in order that it may better engage and move the disk said strip is shown as provided with a longitudinal slot through which the shaft H passes, so that the strip may bear against the disk $M^2$ at both sides of the shaft. The said cam-strip is so shaped that when the shaft is swung upwardly or elevated the pins $m^3 m^3$ will be free from the pinion M and the latter will be free to turn upon the shaft, and the lower part of said cam-strip is outwardly bent or deflected, so that it will carry or thrust outwardly the disk $M^2$ until the said pins are carried outwardly into position for engagement with the pinion. It follows that when the shaft reaches the downward limit of its movement the said pinion will be locked upon the same and the shaft will turn with the pinion, which, as before stated, is at all times in mesh with the gear-wheel $B^2$. Said pinion and gear-wheel $B^2$ are made of such relative size as to give a speed to the shaft H and the apron necessary for delivering the shock from the rear of said apron to the ground without disarranging the stalks in the shock, the apron having for this purpose a speed approximating that of the forward movement of the machine. By the action of the cam-strip $M^3$ upon the moving part of the clutch mechanism described it is obvious that said clutch is actuated to engage the loose pinion M only when the apron is lowered, so that the apron will in all instances be automatically started when the apron is lowered for discharging the shock, and that the rapid movement of the apron will be stopped by the disengagement of the pinion from the shaft as soon as the apron is lifted. Automatically-acting mechanism is thus provided for increasing the speed of the apron at the proper time for the delivery of the shock without the attention of the operator.

The supporting-link I at the side of the apron adjacent to the parts last referred to extends to and is engaged at its end with a cylindric bearing-surface $m^7$, formed on the metal bearing $m^8$, which is secured to the side pieces D', and in which the shaft H turns. The said supporting-link I is thereby pivoted to the apron-frame concentrically with the shaft H, so that said shaft H is moved in an arc concentric with the wheel B and gear-wheel $B^2$ when the apron-frame is raised and lowered, and the gear-pinion M is thereby retained at all times in mesh with said gear-wheel $B^2$, whatever may be the position of the said shaft H.

As hereinbefore stated, the yoke E is lifted to disengage it from the upper part of the shock before the latter is moved rearwardly in discharging it from the machine, and inasmuch as this upward movement of the yoke must take place practically at the same time that the apron is lowered for discharging the shock I have provided a connection between the yoke and the apron-frame by which the lifting of the yoke is automatically accomplished at the proper time without attention on the part of the operator. This connection consists, as herein shown, of arms $E^2 E^2$, forming forward continuations of the ends of the yoke E, and connecting-rods $e^2$, extending from the forward ends of said arms $E^2$ to the rear end of the apron-frame, where they are pivotally connected with the rear ends of the side pieces D' by means of pivot-studs $e^3$. The standards E', which support the said yoke, are herein shown as attached at their lower ends to the side frame-pieces A' at points inside of the wheel-brackets $B^5$, to which they are connected by braces, as shown, and as being supported at their upper parts by braces $e^4 e^4$, reaching to the said side frame-pieces A' at the rear of the standards.

Figures 2, 12, 13, 14, 15:
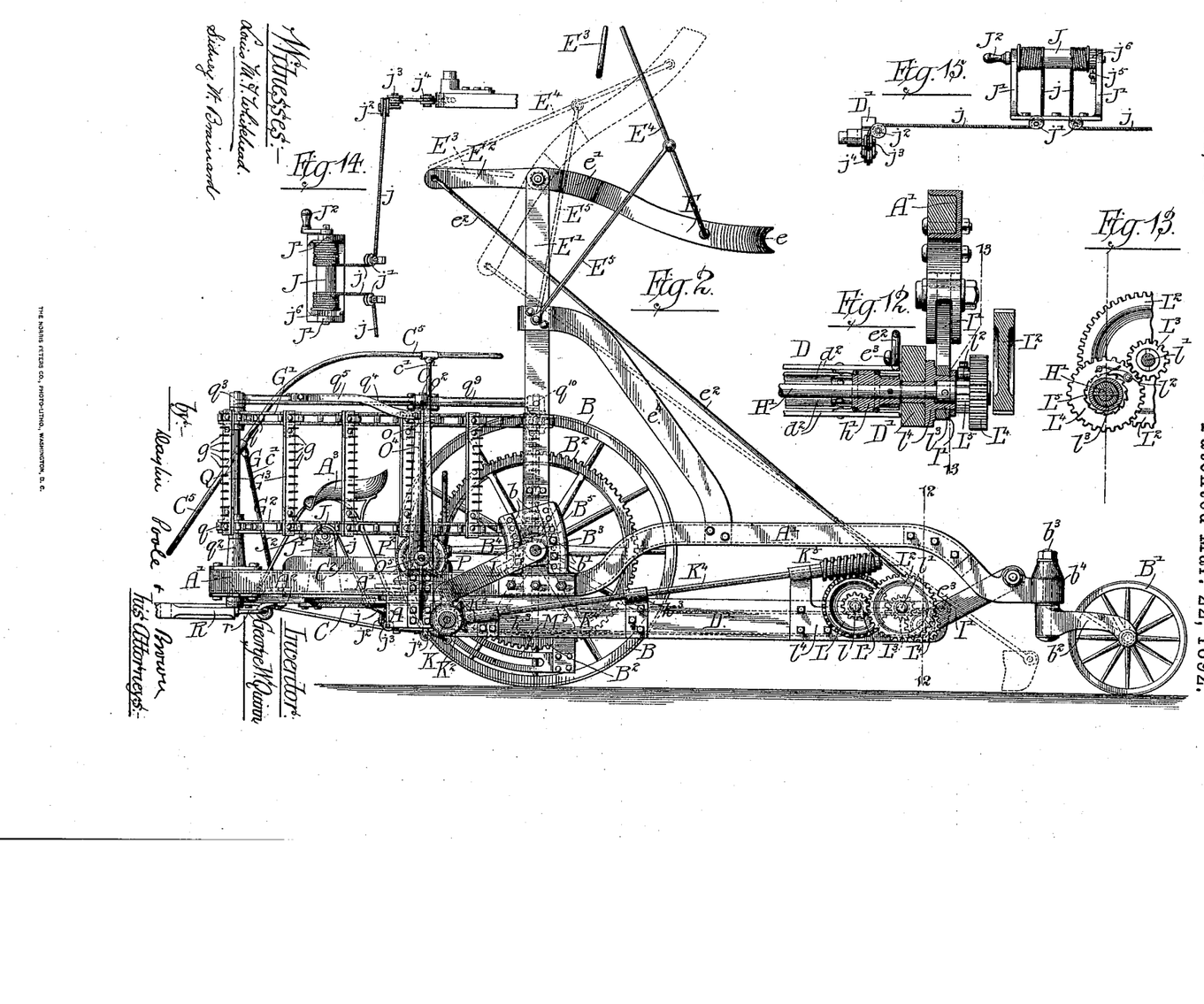
Fig. 2 is a side view thereof, the supporting-wheel nearest the eye being removed to more clearly show the construction of the machine.
Fig. 12 is a detail section taken on line 12 12 of Figs. 1 and 2.
Fig. 13 is a section taken on line 13 13 of Fig. 12.
Fig. 14 is a detail plan view of the devices for lifting and lowering the platform.
Fig. 15 is a front detail elevation of the parts shown in Fig. 14.

The fingers F F, by which the butts of the cut stalks are carried inwardly to and delivered upon the apron, the actuating devices for the said fingers, and adjacent parts are constructed as follows: The wheels F′, by which the said fingers, are immediately supported, Figs. 2, 4, and 5, are mounted on vertically-arranged shafts O O, secured to the transverse frame-piece A at points near the outer ends of said frame-piece and adjacent to the inner ends of the knives C C. Said shafts O O are hollow or tubular, and within the same are mounted the lower ends of other shafts O′ O′, which extend upwardly from said wheels F′ for actuating the carriers G G, as hereinafter described. The said wheels F′ F′, on which the fingers F are mounted, are given rotary motion by means of horizontal shafts P P, mounted upon the side frame-pieces A′, and provided at their outer ends with pinions P′ P′, arranged to intermesh with the gear-wheels $B^2$ $B^2$ on the driving-wheels B B, and at their inner ends with the bevel gear-wheels $P^2$ $P^2$, intermeshing with bevel gear-wheels $O^2$ $O^2$, secured to the shafts O O above the wheels F′. The said fingers F are pivoted at their inner ends to the lower surface of the wheel F′, Figs. 4 and 5, and are provided at their inner ends with lateral arms $f$, having at their free ends depending studs $f'$, which engage a cam-groove $f^2$, formed in a cam-plate $F^2$, which is secured to the frame-piece A beneath the said wheel F′. Said cam-groove is curved in such manner with relation to the circular path followed by the pivots of the arms that said arms will be held radial to the wheel during one part of their movement, but will be inclined with reference to the radial lines of the wheel during another part of their movement, and the arrangement of the cam-groove is such that said fingers will stand in a radial position during the time that they are sweeping the butts of the stalks from the knives inwardly over the frame-piece A, but will be thrown backwardly with reference to the direction of movement of the wheels as the said fingers move outwardly over the forward end of the apron, so that as said fingers approach the outer margin of the apron they will stand in a rearwardly-inclined position and will be nearly tangential to the wheel, and will thus exert practically no further effect to throw outwardly the butts of the stalks; or, in other words, said fingers will be in such position as to be withdrawn from engagement with the stalks when said stalks have been carried a sufficient distance outward as to leave them in the desired position upon the apron. The purpose of so moving the said fingers will be more obvious from a consideration of the fact that if they were rigid and remained radial to the wheel they would tend to carry around in a circular path any stalks which became engaged therewith, and would therefore in many instances carry forward and off of the apron any stalks which did not happen to be released therefrom by the forward movement of the apron. In the construction shown, however, the possibility of the stalks remaining too long in engagement with the fingers and being drawn forward from the apron is prevented by the backward yielding or deflection of the fingers, which allows the prompt escape of the stalks therefrom as soon as the said stalks have been carried laterally a sufficient distance to insure their proper lateral distribution upon the apron. In the particular cam illustrated the cam-groove $f^2$ is provided with a concentric part adjacent to the knife C, by which the fingers are held in a radial position while passing over the said knife and the frame-piece A, with an inwardly-deflected part adjacent to the apron by which the outer ends of the fingers are gradually thrown to the rear (having reference to their direction of bodily movement) as they pass outwardly over the apron, and an abruptly-inclined part adjacent to the outer end of the frame-piece A, by which the fingers are quickly returned to their radial position after passing from the apron.

The chain belts G′ $G^2$ of the carrier G are supported at their ends by means of vertical shafts Q Q′, provided with sprocket-wheels $q$ $q$ $q'$ $q'$, over which the said chain belts are trained at their forward and rear ends, respectively. The said chain belts are engaged between their ends by means of sprocket-wheels $o'$ $o'$, secured to the vertical shaft O′, hereinbefore mentioned, which shaft is actuated for the purpose of giving motion to said chain belts by means of a bevel-gear $P^3$ on the inner end of the shaft P, arranged to mesh with a bevel-pinion $O^3$, secured to the said shaft O′ above the gear-wheels $O^2$, above referred to.

The gear-wheels $O^3$ and $P^3$, by which the shaft O′ is driven, are so proportioned as to give a considerably greater speed to said carrier G than is given the arms F′ by the gear-wheels $O^2$ $P^2$. In the construction illustrated the gear-pinion $O^3$ is made much smaller than the gear $P^3$, while the gear-wheels $O^2$ and $P^2$ are made of about the same size; but any suitable arrangement or proportion of the gear-wheels may be employed in order to produce the result stated. The object of giving such increased speed to the carrier G is to secure the movement of the upper parts of the stalks toward the rear of the machine more rapidly than the butts of the stalks are carried by the fingers F, so as to insure the proper delivery of the upper parts of the stalks to the yoke E.

Referring to the details of construction in the parts last-above described, the forward shaft of each carrier is supported at its lower end in a bearing $q^2$, attached to the forward end of the side frame-piece A′, which is extended forward a sufficient distance to support the said shaft. To afford bearings for the upper end of the central shaft O′, a standard $O^4$ is attached to the side frame-piece A′, such standard having an overhanging arm or bracket at its upper end, to which is attached a bearing $o^2$ for the upper end of the said shaft O'. Said standard O⁴ is constructed at its lower end to form a bearing O⁵ for the shaft P. The upper end of the forward shaft Q is mounted in a bearing $q^3$, which is supported by an arm $q^4$, attached to the bearing $o^2$, and by a brace $q^5$, extending from the standard O⁴ to the arm $q^4$. A bearing $q^6$ for the lower end of the rear shaft Q' is formed upon an inwardly-extending bracket $q^7$, attached to the standard E', and a bearing $q^8$ for the upper end of said shaft Q' is attached to an arm $q^9$, attached to the bearings $o^2$ and a brace-rod $q^{10}$, extending from the said bearing $q^8$ to the said standard E'. As a convenient construction, the arms $q^4$ and $q^9$ are cast integral with the bearings $o^2$, $q^3$, and $q^8$.

As hereinbefore stated, the belts G' G' of the carriers G are located at a considerable distance apart vertically and connected by vertical rake-bars carrying teeth to engage the stalks. This construction is employed in order to insure engagement of the carriers with stalks of varying heights and to render more certain the action of the said carriers in high winds and under other adverse circumstances. As hereinbefore stated, the axles B³, on which the main wheels B B are mounted, are made adjustable upon the main frame by means of brackets B⁵, attached to the side frame-pieces A'. In order to permit of vertical adjustment of said wheels without disengaging the gear-wheels B² B² from the pinions P' P', which latter are mounted on the main frame, the said brackets B⁵ B⁵ are curved in an arc concentric with the shafts P P, so that whatever may be the vertical position of the axles B³ B³ of the main wheels said axles will always be equidistant from the said shafts P P, and the said gear-wheels and pinions will therefore always remain in mesh. The shifting of the wheel-axles relatively to the frame will, of course, have no effect upon the driving mechanism for the apron D, because the apron-frame is sustained at its forward end by the links I I, mounted to turn about said axles and which are connected with the apron-frame concentrically with the pinions K' M, so that said pinions will preserve the same relation to the gear-wheels B² B² whatever may be the position of the apron. In order to prevent the shafts P P from being thrown out of their proper operative relation to the cam-bars M³ when the wheel-axles are shifted, the said cam-bars are connected at their forward or upper ends with the machine-frame by means of circular bearing-apertures in the ends of the cam-bars, which are fitted over the ends of the bearings O⁵ O⁵ of said shafts P P, so that said cam-bars may swing on pivotal axes concentric with said shafts, and the rear or lower ends of said bars are curved upwardly and secured to the plates $b$ $b$, to which the wheel-axles are attached. By thus supporting the cam-bars the latter are maintained concentric with the pivots of the links I I, so that the disks M² M² will remain in proper engagement with the cam-bars when the wheel-axles are adjusted upon the frame.

It will of course be seen that when the axles of the main supporting-wheels are shifted relatively to the main frame, so as to bring the said frame nearer to or farther from the ground, the apron will need to be moved to a greater or less distance in order to bring it near the ground for the discharge of the shock; but this difference in the distance through which the apron is vertically moved is provided for by the use of the windlass form of lifting device described, which enables the operator to lower the apron until it rests or drags upon the ground at the time of the discharge of the shock and to lift it until it comes into proper position relatively to the main frame of the machine without reference to the actual distance of the said frame above the ground. The forward end of the apron-frame being directly connected with the wheel-axles by the links I, while the main frame of the machine is adjustably connected with the said axles, the vertical shifting of the axles will obviously produce a slight change in the position of the front end of the apron relatively to the frame-piece A when the apron is lifted; but this slight shifting of position will have no effect upon the operation of the machine, inasmuch as the frame-piece A' may be undercut, so as to overhang the apron at its upper part, and the plate may be extended rearwardly past the said frame-piece in the manner shown, and thus insure the proper delivery of the butts of the cut stalks to or upon the apron, notwithstanding slight variations in the position of the front edge of the apron.

It is obvious that when the apron is thrown backwardly and downwardly an open space will be left behind the front transverse frame-piece, and to prevent butts of stalks from falling into said space during the time in which the discharge of the shock from the apron is being accomplished any suitable means may be applied to temporarily arrest the rearward movement of the butts, so as to prevent them being swept rearwardly from the supporting-plate C' by the rearward movement of the fingers F F. One practical form of device for this purpose is shown in the drawings, and illustrated more particularly in Figs. 1, 18, and 19. This device consists, essentially, of two swinging arms C³ C³, which are pivoted adjacent to the rear edge of the frame-piece A in such manner as to swing in a vertical plane, the inner ends of the arms being located adjacent to each other at the rear of the driver's seat, so that the free ends of the arms may be swung or moved by the driver outwardly and downwardly across the space between the guard-plates C² C² and the wheels F' F', which support the fingers F F. For convenience in moving or actuating the arms C³ C³ the same are shown as provided adjacent to their pivots with intermeshing gear-segments $c$ $c$, so arranged that when one of the arms is moved outwardly and downwardly the other arm will be correspondingly shifted. Said arms are shown as mounted on a bracket $C^4$, attached to the frame-piece A at the rear of the driver's seat in the manner illustrated. In the usual operation of the machine said arms $C^3 C^3$ will stand in a vertical position entirely within the guides $C^2 C^2$, so that they are at this time entirely out of the way of the moving stalks. When, however, they are thrown downward into a horizontal position, they serve to arrest the rearward movement of the lower ends of the stalks, and thereby allow the same to accumulate upon the plates $C' C'$ until the apron is lifted and brought into its working position. In order to allow the continued rotation of the fingers F F during the time the stalks are held from backward movement by the arms $C^3 C^3$, said fingers F F are connected yieldingly with the lateral arms $f f$, by which said fingers are operated, the yielding connection being sufficiently rigid or strong to hold the said fingers F F in their working position in the usual operation of the machine, but being adapted to allow the fingers to yield backwardly, and thereby permit the same to pass the stalks when the forward movement of the latter is interrupted by the presence of the arms $C^3 C^3$. As illustrated in Fig. 17, the finger F and arm $f$ are mounted to turn independently on the stud $f^3$, secured in the wheel F', and a coiled spring $f^4$, placed around said stud and engaged at its ends with the said finger, serves to hold the arm in its working position relatively to the finger, suitable stops $f^5 f^5$ being provided to limit the relative movement of the parts under the action of the spring.

When the rearward movement of the butts of the stalks is interrupted during the discharge of the shock by devices of the character above described, it is obviously necessary that means should be provided for supporting the upper ends of the stalks, inasmuch as the yoke E is at this time thrown upwardly or elevated to allow the completed shock to pass beneath it when discharged. As far as the operation of the other parts of the machine is concerned, a suitably-arranged movable yoke may be supported in any desired manner and may be adapted to be thrown into position to support the stalks either automatically or by hand. I have shown in the accompanying drawings, Figs. 1 and 2, a device for this purpose which is operated automatically by the movement of the main yoke E. This device consists of a supplemental yoke $E^3$, attached to and supported by two rods $E^4 E^4$, which are pivoted to the yoke E and connected between their ends with the standard E' by means of links $E^5 E^5$. These parts are so arranged that when the main yoke E is in its normal position the yoke $E^3$ will be above the tops of the stalks, and when said main yoke is thrown upward the supplemental yoke will be thrown downwardly and forwardly into position for engagement with the tops of the corn, and preferably at a point considerably forward of the main yoke. The said supplemental yoke $E^3$ is preferably made of the same form as the yoke E, but considerably narrower than the space between the rear ends of the carriers G G, so that the upper ends of the stalks resting in the supplemental yoke will be confined laterally thereby, and thus held free from the said carriers, which may thereby continue their rearward movement without contact with the stalks, which are temporarily supported in the supplemental yoke.

I have shown in Figs. 1 and 2 guide-rods $C^5 C^5$ as arranged inside of and approximately parallel with the carriers G G, said guide-rods serving the purpose of holding the stalks outwardly and adjacent to the said carriers during the time the latter are acting upon the stalks, thereby avoiding liability of the stalks becoming displaced or thrown inwardly at their upper ends in case of high winds or under other circumstances. Said guide-rods are shown as made continuous with each other at their rear or inner ends and as supported upon the machine-frame by standards $c' c'$. The rear or trailing wheels B' B' are herein shown as mounted in swinging arms $b^2$, connected with the rear end of the frame-piece by vertical pivots $b^3$ passing through bearings $b^4$, attached to the rear ends of said frame-pieces.

The draft connections illustrated consist of thills R, attached at their rear ends to eyes $r r$, which are secured to the platform $A^2$. The forward or lower ends of the guide-rods $C^5 C^5$ are shown as terminating at points within the thills, so as to thrust outwardly inwardly bent or inclined stalks and bring the same into position to be acted upon by the carriers G G.

When more than one horse is required, others will be harnessed in front of the thill-horse, so as to travel between the rows of grain being cut by the machine. This arrangement of draft connections, while convenient, inasmuch as it enables the driver seated on the platform $A^2$ to easily drive both or all of the horses, is not essential, inasmuch as the machine may be drawn by horses traveling outside of the rows being cut, or by three horses abreast, one between the rows being cut and the others outside of the same. These methods of drawing the machine are not, however, as desirable as that first described, owing to the obvious difficulty of managing and guiding horses separated by the rows of stalks, unless a separate driver is provided for each horse. Many of the details of construction present in the drawings are shown only for the purpose of illustration and may be materially varied without departure from the essential features of my invention.

I claim as my invention—

1. The combination, with the cutting device of a corn-harvester, of a traveling apron located at the rear of the same and having a slow rearward movement and an elevated yoke to receive the tops of the stalks, located centrally over the said apron, substantially as described.

2. The combination, with the cutting device of a corn-harvester, of a traveling apron located at the rear of the same and having a slow rearward movement, an elevated yoke to receive the tops of the stalks, located centrally over the said traveling apron, and rearwardly and outwardly moving fingers for carrying the cut stalks from the cutting device to the forward part of the apron and distributing them laterally thereon, substantially as described.

3. The combination, with the cutting device of a corn-harvester, of a traveling apron located at the rear of the same and having a slow rearward movement, an elevated yoke to receive the tops of the stalks, located centrally over the said traveling platform or apron, rearwardly and outwardly moving fingers for carrying the cut stalks from the cutting device to the forward part of the apron and distributing them laterally thereon, and rearwardly-movable carriers located above the said fingers for carrying the tops of the corn toward the said elevated yoke, substantially as described.

4. The combination, with the cutting device of a corn-harvester, of a traveling apron located at the rear thereof, said apron being bodily movable toward and from the ground, an elevated yoke for receiving the tops of the cut stalks, and rearwardly and laterally movable fingers for distributing the butts of the corn laterally upon the apron, substantially as described.

5. The combination, with the cutting device of a corn-harvester, of a traveling apron located at the rear thereof, said apron being bodily movable toward and from the ground, an elevated yoke for receiving the tops of the cut stalks, rearwardly and laterally movable fingers for distributing the butts of the corn laterally upon the apron, means for driving the apron slowly for distributing the butts of the cut stalks from front to rear thereof, and means for driving said apron rapidly to discharge the completed shock from the apron, substantially as described.

6. The combination, with the cutting device, of a horizontally-arranged traveling apron located at the rear of said cutting device, said apron being bodily movable toward and from the ground, and means applied to drive the said apron slowly when elevated and rapidly when depressed, substantially as described.

7. The combination, with the cutting device, of a horizontal rearwardly-movable apron located at the rear thereof, an elevated yoke for receiving the tops of the cut stalks, said apron being bodily movable toward and from the ground, driving mechanism for giving slow rearward movement to the said traveling apron, actuated from one of the supporting-wheels of the machine, and driving mechanism for giving rapid rearward movement to the said apron, also actuated from one of the supporting-wheels of the machine and embracing a detachable connection or clutch by which the apron may be thrown into and out of gear with the driving-wheel, substantially as described.

8. The combination, with the cutting device, of a rearwardly-moving apron located at the rear thereof, an elevated yoke for receiving the tops of the cut stalks, said apron being bodily movable toward and from the ground, driving mechanism for giving slow rearward movement to the said traveling apron, actuated from one of the supporting-wheels of the machine, driving mechanism for giving rapid rearward movement to said apron, also actuated from one of the supporting-wheels of the machine and embracing a detachable clutch or connection by which the apron may be thrown into and out of gear with the driving-wheel, and means for automatically operating such connecting device or clutch when the apron is lowered, substantially as described.

9. The combination, with the cutting device, of a horizontal rearwardly-moving apron located at the rear thereof, an elevated yoke for receiving the tops of the cut stalks, said platform or apron being bodily movable toward and from the ground, driving mechanism for giving slow rearward movement to the said traveling platform or apron, actuated from one of the supporting-wheels of the machine, and driving mechanism for giving rapid rearward movement to the said apron, also actuated from one of the supporting-wheels of the machine and embracing a detachable connection or clutch by which the apron may be thrown into and out of gear with the driving-wheel, said apron being connected with the driving mechanism giving it slow movement by a pawl and ratchet, whereby it may be driven rapidly without disconnecting it from the said driving mechanism for giving it slow movement, substantially as described.

10. The combination, with the machine-frame and a cutting device attached thereto, of a traveling apron located at the rear of the cutting device, an elevated yoke for receiving the cut stalks, located over said apron, revolving fingers for moving the butts of the stalks rearwardly and outwardly, supporting-wheels provided with gears for actuating the said revolving fingers, and pinions mounted on the frame, having connection with the fingers and intermeshing with the said gear-wheels, said supporting-wheels being movable upon the frame in an arc concentric with the said pinions, whereby the frame may be raised or lowered without affecting the said driving connections, substantially as described.

11. The combination, with the frame and a cutting device mounted thereon, of supporting-wheels for the frame, a traveling apron located at the rear of the cutting device, an elevated support or yoke for receiving the upper ends of the stalks, and means for actuating the said apron, embracing gear-wheels upon said supporting-wheels and pinions intermeshing with said gear-wheels and having operative connection with the apron, said apron and pinions being movable toward and from the ground in a curved path concentric with the said supporting-wheels, whereby the apron may be raised and lowered without disconnection of the driving mechanism, substantially as described.

12. The combination, with the machine-frame, of supporting-wheels therefor, a cutting device upon the frame, a traveling apron located at the rear of the cutting device, a frame for supporting the apron, pivotal links connecting said apron-frame with the machine-frame, one pair of which are mounted concentrically with the supporting-wheels, and driving connections for actuating the apron, consisting of gears on the supporting-wheels and pinions mounted on the apron-frame and intermeshing with the said gear-wheels, substantially as described.

13. The combination, with the machine-frame and cutting device thereon, of a rearwardly-moving apron located at the rear of said cutting device, an elevated yoke to receive the tops of the cut stalks, and revolving fingers for moving the butts of the cut stalks rearwardly upon and distributing them laterally over the said apron, said fingers being pivotally supported, whereby they may be inclined backwardly with reference to their direction of motion to disengage them from the stalks, substantially as described.

14. The combination, with the machine-frame and cutting device thereon, of a rearwardly-moving apron located at the rear of said cutting device, an elevated yoke to receive the tops of the cut stalks, revolving fingers for moving the butts of the cut stalks rearwardly and distributing them laterally over said apron, a horizontally-arranged wheel to which said fingers are pivotally connected, and a cam acting upon the fingers to move them on their pivots, and means for actuating said wheel, substantially as described.

15. The combination, with the machine-frame and cutting devices mounted at the forward end thereof, of a traveling apron located at the rear of the said cutting device, an elevated yoke arranged centrally over the said apron, rearwardly and outwardly moving fingers located adjacent to the cutting devices for carrying the butts of the cut stalks rearwardly and laterally upon the apron, and rearwardly and inwardly inclined carriers located above the said fingers for carrying the tops of the stalks rearwardly toward the said elevated yoke, said carriers being driven at a speed greater than that of the fingers, substantially as described.

16. The combination, with the machine-frame and a cutting device mounted thereon, of a traveling apron located at the rear of the cutting device and bodily movable toward and from the ground, mechanism for moving the said apron slowly when elevated, said driving mechanism including a change-speed device by which the speed of the apron may be changed, and other driving mechanism for driving the apron rapidly when depressed, substantially as described.

17. A machine for cutting two rows of stalks at once and forming the same into a standing shock, comprising a frame covering the width of two rows and provided with supporting-wheels at its sides, running outside of the rows, two cutting devices located in alignment with the rows to be cut, a slowly-moving traveling apron located at the rear of said cutting devices, said platform being movable toward and from the ground, driving devices for giving both slow and rapid movement to said apron, an elevated yoke to receive the upper ends of the cut stalks, and means for carrying the stalks rearwardly from the cutters to and delivering them upon the said traveling apron, substantially as described.

18. A machine for cutting two rows of stalks at once and forming the same into a standing shock, comprising a frame covering the width of the two rows and provided with supporting-wheels at its sides, running outside of the rows, two cutting devices located in alignment with the rows to be cut, a slowly-moving traveling apron located at the rear of said cutting devices, said platform being movable toward and from the ground, driving devices for giving both slow and rapid movement to said apron, an elevated yoke to receive the upper ends of the cut stalks, and means for carrying the stalks rearwardly from the cutters to and delivering them upon the said apron or platform, comprising two sets of rearwardly and outwardly moving fingers acting to distribute the butts of the stalks laterally upon the said platform or apron and rearwardly and inwardly moving carriers for delivering the tops of the cut stalks to said yoke, substantially as described.

19. The combination, with the machine-frame comprising a transverse frame-piece at its front end, of the oblique cutting-knives extending forward from said frame-piece, a rearwardly-moving apron located at the rear of said frame-piece, a plate extending from the rear edges of the knives over the top of the said frame-piece, revolving fingers located over said plate, an elevated yoke to receive the tops of the cut stalks, and an elevated carrier for delivering the upper parts of the stalks to the said yoke, substantially as described.

20. The combination, with the machine-frame comprising a transverse frame-piece at the front of the machine and parallel side pieces attached thereto, of cutting-knives attached to the front of said frame-piece, a rearwardly-moving apron located at the rear of said frame-piece between said side frame-pieces, a wheel mounted over said transverse frame-piece, and carrying-fingers for moving the butts of the cut stalks rearwardly from the cutting-knives to the apron, an elevated yoke to receive the tops of the cut stalks, and an elevated carrier to deliver the upper parts of the stalks to said yoke, substantially as described.

21. The combination, with a machine-frame comprising a transverse frame-piece at the front of the machine and parallel side frame-pieces attached to said transverse frame-piece, of cutting-knives attached to the front of said transverse frame-piece, a rearwardly-moving apron located at the rear of said frame-piece between said side frame-pieces, an elevated yoke to receive the tops of the cut stalks, horizontal plates extending from the cutting-knives rearwardly over the said frame-piece, revolving fingers for moving the butts of the cut stalks rearwardly over said plates, and vertical guide-plates for retaining the butts of the stalks in position to engage the fingers, substantially as described.

22. The combination, with the cutting device of a corn-harvester, of a traveling apron located at the rear of the same and having a slow rearward movement, said apron being bodily movable toward and from the ground, rearwardly and outwardly moving fingers for carrying the cut stalks from the cutting device to the forward part of the apron and distributing them laterally thereon, a movable elevated yoke to receive the tops of the stalks, movable arms adapted to be thrown into the path of the stalks for arresting the rearward movement of their lower ends when the apron is depressed, and a movable supplemental yoke adapted to receive the tops of the stalks when the main yoke is elevated, substantially as described.

In testimony that I claim the foregoing as my invention I affix my signature in presence of two witnesses.

GEORGE W. QUINN.

Witnesses:
C. CLARENCE POOLE,
M. E. DAYTON.